United States Patent [19]

Cunningham et al.

[11] Patent Number: 4,933,534

[45] Date of Patent: Jun. 12, 1990

[54] ELECTRICAL HEATER AND PLUG

[76] Inventors: Paul A. Cunningham, 118 West St., Attleboro, Mass. 02703; Frederick G. J. Grise, 137 E. Bay Rd., Osterville, Mass. 02655

[21] Appl. No.: 276,376

[22] Filed: Nov. 23, 1988

[51] Int. Cl.$^5$ .............................................. H05B 3/36
[52] U.S. Cl. ...................................... 219/387; 174/69; 439/668; 219/521; 219/549
[58] Field of Search ............... 219/385, 386, 387, 521, 219/528, 529, 549; 174/69; 439/668

[56] References Cited

U.S. PATENT DOCUMENTS

| | | | |
|---|---|---|---|
| 2,475,379 | 7/1949 | Stong | 201/73 |
| 2,648,754 | 8/1953 | Lytle | |
| 2,730,598 | 1/1956 | Lytle | 201/73 |
| 2,902,535 | 9/1959 | Francis | 174/69 |
| 2,961,522 | 1/1960 | Hammer | |
| 3,057,952 | 10/1962 | Gordon | 219/549 |
| 3,067,310 | 12/1962 | Walz et al. | |
| 3,283,284 | 11/1966 | Eisler | 219/528 |
| 3,284,757 | 11/1966 | Krone | 339/176 |
| 3,425,864 | 2/1969 | Morey | 117/215 |
| 3,573,430 | 4/1971 | Eisler | 219/385 |
| 3,721,803 | 3/1973 | DiStefano | 219/387 |
| 3,751,629 | 8/1973 | Eisler | 219/385 |
| 3,790,752 | 2/1974 | Boaz et al. | 219/522 |
| 3,811,934 | 5/1974 | Glaser | 117/212 |
| 3,895,218 | 7/1975 | Cooke | 219/543 |
| 4,031,356 | 6/1977 | Niibe | 219/509 |
| 4,071,736 | 1/1978 | Kamerling | 219/219 |
| 4,071,737 | 1/1978 | Marshall et al. | 219/345 |
| 4,134,004 | 1/1979 | Anderson et al. | 219/387 |
| 4,322,122 | 3/1982 | Schwartz et al. | 339/147 |
| 4,367,398 | 1/1983 | Strube et al. | 219/541 |
| 4,591,701 | 5/1986 | Tokumaru | 219/543 |
| 4,665,304 | 5/1987 | Spencer | 219/219 |
| 4,707,586 | 11/1987 | Voss et al. | 219/203 |
| 4,720,274 | 1/1988 | Tackett et al. | 439/668 |
| 4,752,672 | 6/1988 | Grise | 219/543 |

OTHER PUBLICATIONS

Hughes ad, Hughes Industrial Systems Division, Oct. 1960.

Primary Examiner—Teresa J. Walberg
Attorney, Agent, or Firm—Fish & Richardson

[57] ABSTRACT

An electrical heater, to be powered from an automotive-type cigarette lighter socket, includes a heating element, a plug configures to be inserted into the cigarette lighter socket, and a pair of conductors permanently connecting the heating element to the plug. The plug has a flat substrate and a pair of conductors mounted on the substrate. An electrical plug, for a lighter socket of the kind having an inner wall of a predetermined diameter and a pair of electrical contacts, includes a flat assembly having a flat dielectric base having a width corresponding to the predetermined diameter, and a pair of flat conductors attached to the base for touching the pair of electrical contacts in the socket.

22 Claims, 3 Drawing Sheets

ELECTRICAL HEATER AND PLUG

BACKGROUND OF THE INVENTION

This invention relates to electrical heaters powered from automotive-type cigarette lighter sockets, and to electrical plugs for such sockets.

Such an electrical heater could be used, for example, to keep a pizza pie warm on the way home from the pizza shop. It has been proposed to put such a heater directly into the cardboard pizza box beneath the pizza or to include it in a carrier into which the cardboard box is placed. The heater is powered from the cigarette lighter socket via a plug. It is known to use such plugs to power a wide variety of electrical devices.

SUMMARY OF THE INVENTION

In one aspect, the invention provides an electrical heater, complete with a plug for an automotive cigarette lighter socket, whose configuration and materials are so economical and simple to fabricate that the entire device may be discarded after use.

One general feature of the invention is the combination of a heating element, a plug configured to be inserted into the cigarette lighter socket, and a pair of conductors permanently connecting the heating element to the plug.

In another general feature of the invention, the cable connecting the heating element to the plug has a flat substrate and a pair of conductors mounted on the substrate.

Preferred embodiments of the invention include the following features. The conductors comprise wires. The flat substrate comprises two layers of biodegradable paper (held together by adhesive) with the conductors sandwiched between the layers. The heating element and the plug comprise substrates bearing flat conductive layers. The heating element includes a flexible substrate (e.g., biodegradable paper) bearing a resistance coating (e.g., deposited metal). The cable has a periodic series of transverse folds along the length of the substrate. The plug includes a flat substrate having a width corresponding to (e.g., slightly greater than) the diameter of the cigarette lighter socket, and a pair of conductors attached to the substrate for touching a pair of contacts in the lighter socket. The substrate of the plug is, e.g., a sheet of plastic laminated paper. The plug has a series of teeth located to touch the inner wall of the socket, each tooth having a more tapered leading edge to make insertion of the plug easier, and a less tapered trailing edge to make removal of the plug more difficult. One of the flat conductors of the plug lies along an axis of the plug for making connection with a central contact of the socket, and that conductor extends beyond the end of the substrate and has a contour which provides resilience to the conductor in the direction of the axis of the plug.

Another general feature of the invention is the plug itself.

Food (e.g., pizza pie) and other items may be kept warm while in transit. In the case of pizza, the devices are so inexpensive that they can be given away to the customer with the pizza box. The invention can be stored compactly and conveniently, ready for use, and can be used without any modification to the pizza box. Because the resistance coating draws relatively little power and operates at relatively low temperature, the heating element need have no insulating or mechanical support and can simply be a sheet of paper with a metal coating. The plug is disposable, easy to use, and is held securely in the socket. Multiple stacked plugs can be inserted into a single socket to serve multiple heaters or other devices. The heater is attractive and interesting to look at and use and thus provides a natural promotional device for pizza shops. Logos and other marketing slogans can be printed on the heating element, the cable, and the plug. Because all of the elements of the heater have flat substrates, economical, web type continuous processing equipment may be used.

Other advantages and features will become apparent from the following description of the preferred embodiment, and from the claims.

DESCRIPTION OF THE PREFERRED EMBODIMENT

We first describe the drawings.

FIG. 1 is a perspective view of a pizza heater in a pizza box.

FIG. 2 perspective view of the heater element curled slightly to emphasize its flexibility.

FIG. 3 perspective view of the plug, paper cable, and a portion of the heater element of the FIG. 1 heater.

STRUCTURE

Figure 1:
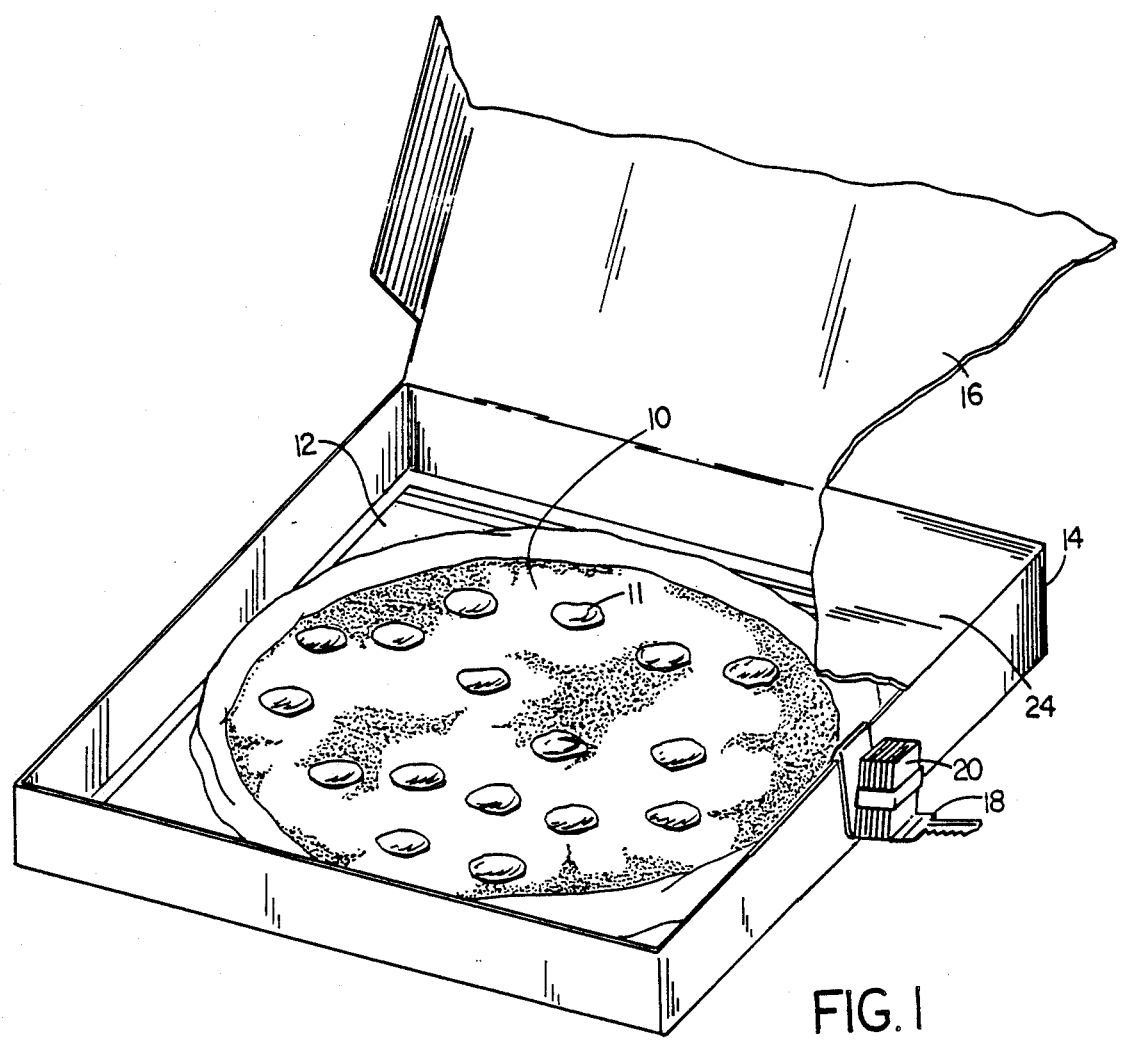

Referring to FIG. 1, to keep hot pizza pie 10 (with pepperoni 11) warm while it is being carried in a car, a heating element 12 of a disposable electrical heater is placed on the bottom of the cardboard pizza box 14 beneath the pizza. Electrical power is delivered to the heater from a car cigarette lighter socket via a disposable cigarette lighter plug 18 connected by a disposable cable 20 to the heating element 12. Cable 20 is prefolded to fit over the side wall 22 of the box and under the side wall 24 of the box lid 16 (in FIG. 1, only a small fragment of the box lid is shown in place as if the lid were closed).

Figure 2:
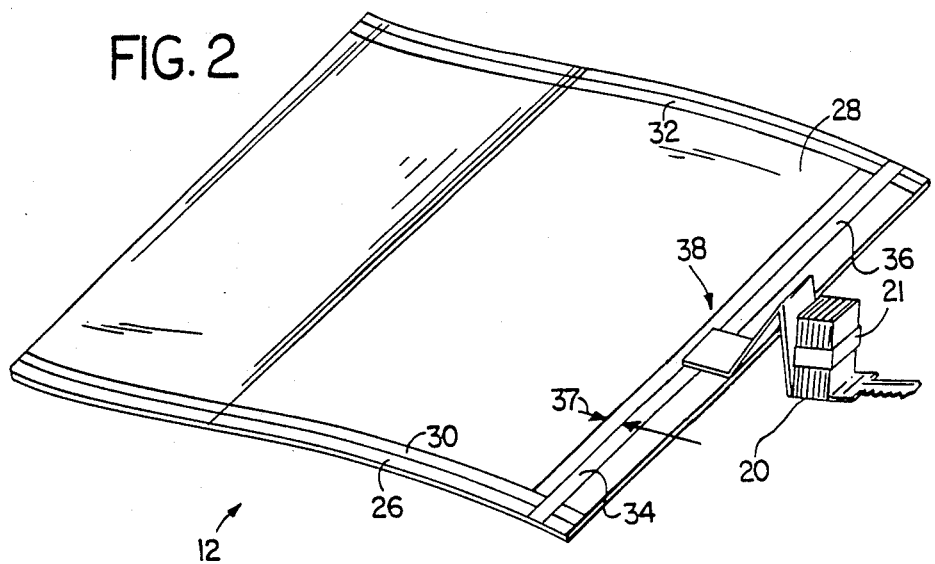

Referring to FIG. 2, heating element 12 has a single sheet of flexible biodegradable kraft paper (0.006 inches thick) as a substrate 26 which bears a sputtered nickel resistance coating 28. The sputtered coating is thin, e.g., 3000 A, to provide a resistance (between the conductive stripes 30, 32) of about 9.6 ohms for a coating area that is 8" by 8" (for a 10" pizza), or 12" by 12" for a 16" pizza. This would achieve a temperature of about 130° F. using 15 watts of power at 12 volts and 1.25 amps (the required current and wattage rise proportionally with the area of the coating). The 130° temperature is appropriate for keeping a pizza warm. A pizza, when just removed from the oven, has a temperature of about 150° F., and should thereafter be kept warm at a temperature that is lower than 150° F. and declines slowly over time.

Two edges of coating 28 are overcoated respectively with two metal conductive stripes 30, 32 (e. g., silver approximately 5000 A thick, having approximately ten times the conductivity of the resistance coating). Stripes 30, 32 in turn meet (and are electrically connected to) two other conductive stripes 34, 36 which are insulated from coating 28 by a region 37. Stripes 34, 36 make connection with cable 20 at a junction 38.

Figure 3:
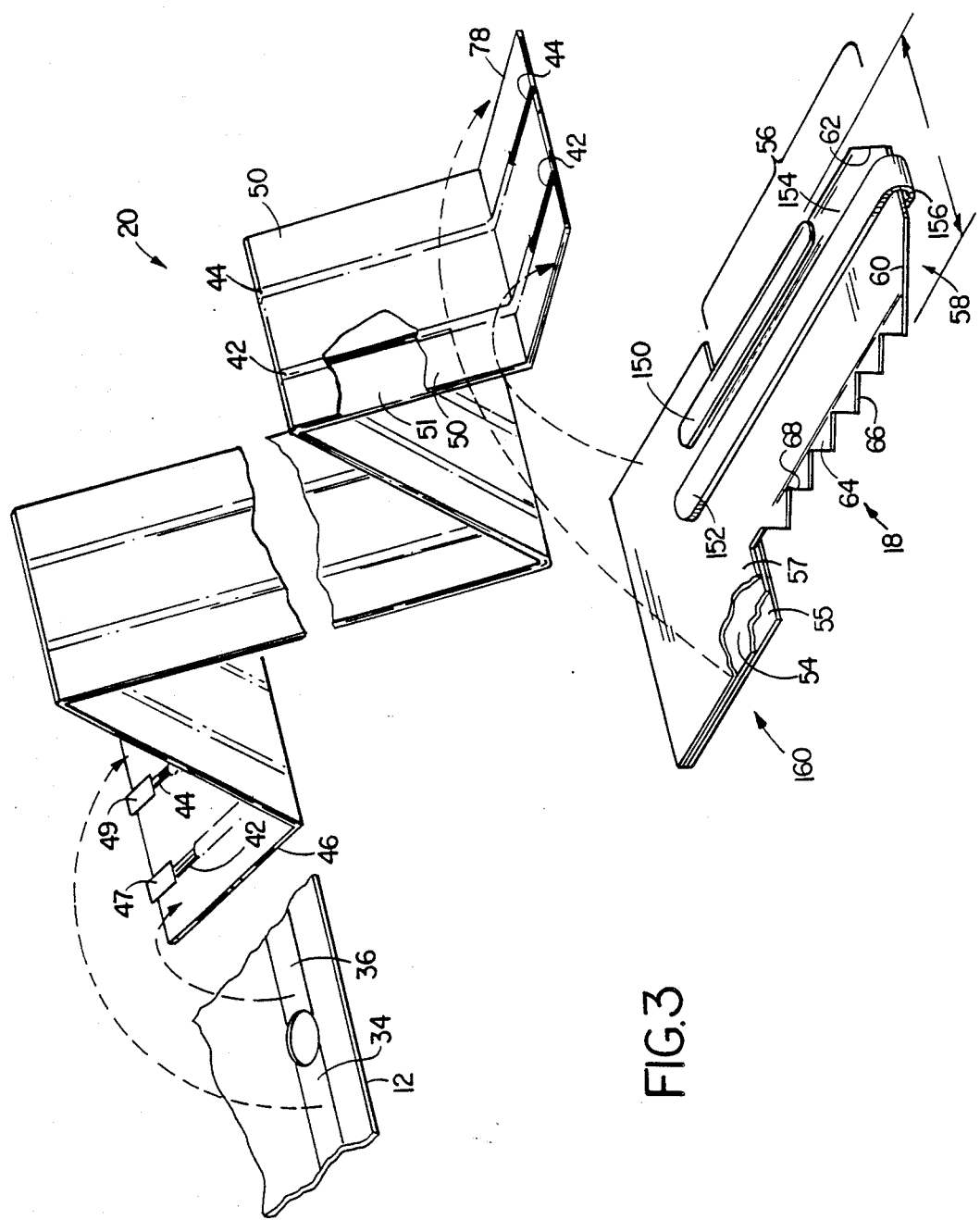

Referring to FIG. 3, cable 20 has two biodegradable kraft paper substrates 50 and 51 in between which are sandwiched two parallel copper wires 42, 44. Paper substrate 51 is adhesive coated on the side facing substrate 50, but substrate 50 is not adhesive coated. At one end 46 of cable 20, substrate 50 is skived to expose the surfaces of wires 42, 44 which are then attached to two tin plated and presoldered copper tabs 47, 49. The tabs are in turn connected to the heating element at junction 38 (using conductive adhesive) so that tab 47 makes electrical contact with heater conductive stripe 36, and tab 49 with stripe 34. At the other end 78 of cable 20, substrate 50 is similarly skived and cable 20 is attached to plug 18 (by soldering) so that wires 42, 44 respectively make electrical contact with two metal conductors 150, 152 on plug 18.

Conductors 150, 152 are small strips of metal (e.g., presoldered tin plated copper) foil that are glued to plug 18. Conductor 152 folds over and lies on both faces of the plug as does conductor 154. When the plug is inserted into a cigarette lighter socket, conductor 150 touches the metal wall of the inside of the lighter socket and the leading tip of conductor 152 touches the central contact of the socket.

Plug 18 includes a biodegradable paper substrate 54 laminated on both sides with plastic layers 55, 57. One end 56 of plug 18 has a width w approximately the size of (in particular slightly greater than) the inside diameter of the cigarette lighter socket. The leading end 58 of plug 18 has tapered edges 60, 62 to make the plug easier to insert into the socket. Along one edge of end 56, the plastic laminate extends beyond the paper substrate and is cut to form a row of teeth 64. Each tooth 64 has one tapered leading edge 66 and a square trailing edge 68. As a result, end 56 is relatively easier to insert into the socket than it is to remove. The teeth also provide a degree of adaptability to the plug, enabling it to be used in sockets having a variety of configurations. In addition the gaps along the edge of the plug provided by the teeth reduce the tendency of the plug to creep out of the socket in reaction to the process of insertion. The other end 160 of the plug is square shaped, like a pizza box, for imprinting a logo of the pizza shop. Logos can also be imprinted on the heating element itself and repeatedly along the cable.

The adhesive which holds conductor 152 on the substrate of the plug ends at point 154, and the tip of the conductor is given a bulging contour such that the tip extends slightly beyond the end of the plug substrate at point 156 and rises slightly above each face of the substrate. This contour imparts a resiliency to the conductor which keeps the conductor tip pressed against the cigarette lighter socket contact when the plug is inserted, notwithstanding any slight tendency for the plug to creep out of the socket after insertion.

MANUFACTURE

Figure 4:
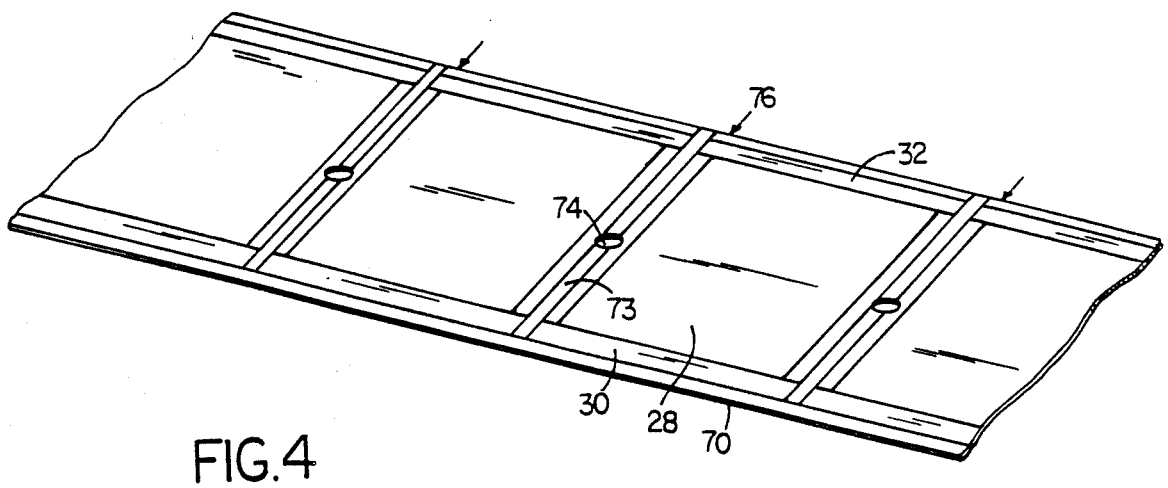
FIG. 4 is a perspective view illustrating the fabrication of elements.

Referring to FIG. 4, for economy, a series of heater elements are made from a single continuous sheet 70 of kraft paper. The sheet is coated (by sputtering or vapor deposition) with a series of resistance coatings 28. Next parallel conductive stripes 30, 32 are coated (by sputtering or vapor deposition) all along the two edges of sheet 70. Conductive stripes 73 are then coated (by sputtering or vapor deposition) across the sheet 70 at regular intervals. A small hole 74 is punched in each stripe 73 thus electrically splitting the stripe 72 to form the two stripes 34, 36 (FIG. 2). Finally, sheet 70 is severed cross-wise at locations 76 to free the individual heater elements.

Cable 20 is made by sandwiching wire from two continuous coils between paper from two continuous rolls (one adhesive coated). The cable is then cut to the proper lengths, accordion folded, and skived as previously explained. The combination of the wires sandwiched between the paper layers provides a neat, compact, and attractive assembly. A paper tab 21 (FIG. 2) is then glued around the folded cable to hold it compactly until ready for use.

Plug 18 is made by plastic laminating a paper substrate, die cutting the teeth, and gluing the conductors onto the laminated substrate.

The heater is finally assembled by soldering one end of the cable to the plug and then soldering the other end of the cable to tabs 47, 49 while simultaneously gluing tabs 47, 49 to stripes 36, 34 with conductive adhesive.

OPERATION

At the pizza shop, the heater is dropped into the bottom of the box before the pizza is put in. In the car, the user pulls on the plug to release tab 21, then extends the cable and inserts the plug into the lighter socket. By pressing on the plug the conductor 152 is compressed at its tip so that when the user stops pressing and the plug creeps back very slightly, the electrical connection continues to be made, due to the resilience of the conductor tip. The heater maintains the pizza at a temperature of, e.g., 130° F., and thus keeps the pizza both warm and crisp.

Figure 5:
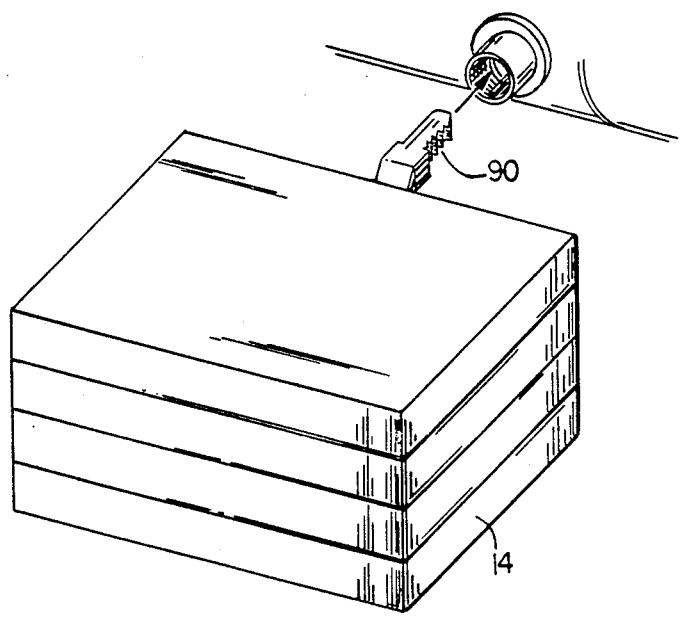
FIG. 5 is a perspective view of a stack of pizza boxes with heaters.

Referring to FIG. 5, because plug 18 is flat, up to, e.g., four plugs 90 may be stacked together and inserted into a single cigarette lighter socket, with each plug serving a separate heater in one of four pizza boxes 14.

Other embodiments are within the following claims. For example, the resistance coating could be applied by other deposition processes and could be other metals, such as tin, copper, or aluminum. The plug could be unlaminated cardboard. The heating element could have a different substrate, such as a paper coated with a biodeqradable polymer (one ten thousandth of an inch thick), with the metal coated lying on the polymer (this improves the uniformity of the electrical characteristics of the resistance coating). The resistance coating could be covered with, e.g., a wax coating. The wires of the cable could be replaced by conductive metal stripes, at greater cost. Foods other than pizza and non-food items could be heated.

We claim:

1. An electrical heater to be powered from an automotive-type cigarette lighter comprising
   a heating element,
   a plug configured to be inserted into the cigarette lighter socket, and
   a pair of conductors permanently connecting the heating element to the plug,
   said heating element and said plug copmprising flat substrates bearing flat conductive layers.

2. An electrical heater to be powered from an automotive-type cigarette lighter comprising
   a heating element,
   a plug configured to be inserted into the cigarette lighter socket, and
   a pair of conductors permanently connecting the heating element to the plug,
   and wherein the plug is flat.

3. A disposable pizza heater to be powered from an automotive-type cigarette lighter socket, comprising
- a flexible heating element having a paper substrate bearing a resistance coating of deposited metal and sized to lie flat in a bottom of a pizza box,
- a flat plug configured to be inserted into the socket and having a paper substrate bearing a pair of conductors, and
- a cable connecting the heating element to the plug and having a paper substrate bearing a pair of conductors.

4. An electrical heater to be powered from an automotive-type cigarette lighter socket, comprising
- a heating element,
- a flat plug configured to be inserted into the cigarette lighter socket, and
- a pair of conductors connecting the heating element to the plug.

5. An electrical heater to be powered from an automotive-type cigarette ligher socket comprising
- a heating element,
- a plug configured to be inserted into the cigarette lighter socket, and
- a cable connecting the heating element to the plug having a flat substrate and a pair of conductors mounted on the substrate, said heating element and said plug comprising flat substrates bearing flat conductive layers.

6. An electrical heater to be powered from an automotive-type cigarette ligher socket comprising
- a heating element,
- a plug configured to be inserted into the cigarette lighter socket, and
- a cable connecting the heating element to the plug having a flat substrate and a pair of conductors mounted on the substrate, and wherein the plug is flat.

7. The heater of claim 6 in which the plug includes a flat substrate having a width corresponding to the predetermined diameter, and a pair of flat conductors attached to the substrate for touching contacts in the socket.

8. The heater of claim 7 in which the flat substrate of the plug comprises biodegradable paper.

9. The heater of claim 8 in which the substrate further comprises plastic laminations on both faces of the paper.

10. The heater of claim 7 adapted for use with a cigarette lighter socket having an inner wall of a predetermined diameter, in which the plug has a width slightly greater than the predetermined diameter.

11. The heater of claim 10 in which the plug has a tooth located to touch the inner wall of the socket, said tooth having a more tapered leading edge to make insertion of the plug easier, and a less tapered trailing edge to make removal of the plug more difficult.

12. The heater of claim 11, in which there are a series of said teeth.

13. The heater of claim 7 in which one of the flat conductors lies along an axis of the plug for making connection with a central contact of the socket, and the one conductor extends beyond the end of the substrate and has a contour which provides resilience to the conductor along the axis.

14. The heater of claim 5 or 6 in which said cable has transverse folds.

15. The heater of claim 14 in which there are a periodic series of said folds along the length of the substrate.

16. The electrical heater of claim 5, 1, or 2 wherein said conductors comprise wires.

17. The electrical heater of claim 5, 6, 1, or 2 wherein said flat substrate comprises two layers with said conductors sandwiched between said layers.

18. The electrical heater of claim 17 wherein said layers are held together by adhesive.

19. The electrical heater of claim 17 wherein said layers comprise biodegradable paper.

20. The heater of claim 5, 6, 1, or 2 in which
the heating element comprises a flexible substrate bearing a resistance coating.

21. The heater of claim 20 in which
the substrate comprises biodegradable paper.

22. The heater of claim 20 in which
the resistance coating comprises deposited metal.

* * * * *